(12) United States Patent
Kutschbach

(10) Patent No.: US 12,254,296 B2
(45) Date of Patent: Mar. 18, 2025

(54) COMPUTER-IMPLEMENTED METHOD AND A COMPUTER-READABLE MEDIUM

(71) Applicant: ILNumerics GmbH, Berlin (DE)

(72) Inventor: Haymo Kutschbach, Berlin (DE)

(73) Assignee: ILNumerics GmbH, Berlin (DE)

( * ) Notice: Subject to any disclaimer, the term of this patent is extended or adjusted under 35 U.S.C. 154(b) by 0 days.

(21) Appl. No.: 18/082,863

(22) Filed: Dec. 16, 2022

(65) Prior Publication Data

US 2023/0259338 A1    Aug. 17, 2023

(30) Foreign Application Priority Data

Feb. 15, 2022 (EP) ................................ 22156804

(51) Int. Cl.
*G06F 9/44* (2018.01)
*G06F 8/41* (2018.01)

(52) U.S. Cl.
CPC ..................... *G06F 8/41* (2013.01)

(58) Field of Classification Search
None
See application file for complete search history.

(56) References Cited

U.S. PATENT DOCUMENTS

| | | | |
|---|---|---|---|
| 9,292,268 B2 * | 3/2016 | Meirowitz | G06F 8/443 |
| 10,558,500 B2 | 2/2020 | Goldsack et al. | |
| 11,144,348 B2 | 10/2021 | Kutschbach | |
| 2011/0173155 A1 | 7/2011 | Becchi et al. | |
| 2012/0254845 A1* | 10/2012 | Yi | G06F 8/45 717/144 |
| 2012/0324430 A1* | 12/2012 | Agarwal | G06F 8/51 717/151 |

(Continued)

FOREIGN PATENT DOCUMENTS

| | | |
|---|---|---|
| JP | 2020-537789 | 12/2020 |
| WO | 2017/016590 | 2/2017 |
| WO | 2018/197695 | 11/2018 |

OTHER PUBLICATIONS

Phitchaya Mangpo Phothilimthana, et al. "Portable Performance on Heterogeneous Architectures", In: Proceedings of the ASPLOS' 13, Houston, Texas, USA, Mar. 16-20, 2013, S. 1-13.

(Continued)

*Primary Examiner* — Qamrun Nahar
(74) *Attorney, Agent, or Firm* — Dicke, Billig & Czaja, PLLC

(57) ABSTRACT

A computer-implemented method includes receiving a program code comprising a sequence of array instructions for at least one input array data structure storing multiple elements of a respective common data type, and function meta information, FMI. The FMI allow for determining an output size information of an output of each array instruction of the sequence of array instructions for an input size information of the at least one input array data structure. The method includes receiving hardware information of a processing unit, compiling, based on the first program segment, the runtime size information and the hardware information, a first compute kernel which is executable on the processing unit; and executing the first compute kernel on the processing unit using the runtime instance of the at least one input array data structure as input.

20 Claims, 6 Drawing Sheets

(56) References Cited

U.S. PATENT DOCUMENTS

| | | | |
|---|---|---|---|
| 2013/0132934 A1* | 5/2013 | Munshi | G06F 8/41 717/149 |
| 2018/0329745 A1* | 11/2018 | Park | G06F 9/4881 |
| 2019/0114548 A1 | 4/2019 | Wu et al. | |
| 2021/0165699 A1* | 6/2021 | Parravicini | G06F 8/451 |

OTHER PUBLICATIONS

J. Ansel, et al.: PetaBricks: A Language and Compiler for Algorithmic Choice. In: Proceedings of the PLDI'09, Dublin, Ireland, Jun. 15-20, 2009, S. 38-49.

Hadi Emaeilzadeh, et al.: Programming Hetereogeneous Hardware Components with Software Components. In: Workshop on SoC Architectures, Accelerators and Workloads (SAW), Feb. 2011, San Antonio, US, 2011.

International Search Report and Written Opinion in PCT/EP2018/060932 dated Aug. 3, 2018.

Mr ANala, et al: "Framework for Automatic Parallelization", 2018 IEEE 25th Intl Conference on High Performance Computing Workshops, Dec. 17, 2018, p. 112-118.

* cited by examiner

COMPUTER-IMPLEMENTED METHOD AND A COMPUTER-READABLE MEDIUM

CROSS-REFERENCE TO RELATED APPLICATIONS

This Utility patent application claims priority to European Patent Application No. 22156804.1, filed Feb. 15, 2022, which is incorporated herein by reference.

TECHNICAL FIELD

Embodiments of the present invention relate to computer-implemented methods, in particular to computer-implemented methods for executing array instructions on typically heterogeneous and/or parallel computing systems, and a computer-readable medium.

BACKGROUND

High demand exists for efficient utilization of computing resources, in particular in the field of numerics and/or for data analysis. This involves the task of parallelizing array instructions which is often tedious, cost intensive and requires significant knowledge of low-level computer architectures and programming technologies related thereto.

Typically, the main challenge of efficiently executing algorithms on heterogenous or parallel computing resources is—for a given problem size and a specific hardware setup— to acquire the correct result within a desired range of precision in the shortest time possible and/or with the lowest energy consumption.

In particular, a solution utilizing all available computing resources in the most efficient way and, thus, leading to shortest execution time may have to be found.

However, efficient mapping of chunks of workload to all available computing resources is a highly challenging task for a compiler.

Historically, the task of a compiler is to lower the user code into code, executable by the targeted processor. Attempts to extend this approach to modern computing systems leads to a high degree of manual decision making by the programmer: which processor to target for processing certain data at certain points in the program. For more than a decade whole industries suffer from an increased maintenance effort, resulting incompatibilities of such programs and longer development cycles, including delayed product deliveries.

For example, the compiler has to make certain decisions: which processing units to target, how to instruct the processing units to process the data and how to provide the data to the processing units. Challenges include the broad diversity of (rapidly changing) computing hardware, the complexity of arbitrary GPL (general purpose programming languages) language elements and instruction graphs, the dynamic nature of the data to be processed, and the times when all constraining information become eventually available.

Accordingly, there is a need to improve the typically compiler-based adaptation of user software programs for computing architectures.

BRIEF DESCRIPTION OF THE DRAWINGS

The components in the figures are not necessarily to scale, instead emphasis is placed upon illustrating the principles of the invention. Moreover, in the figures, like reference numerals designate corresponding parts. In the drawings.

DETAILED DESCRIPTION

Figure 1A:
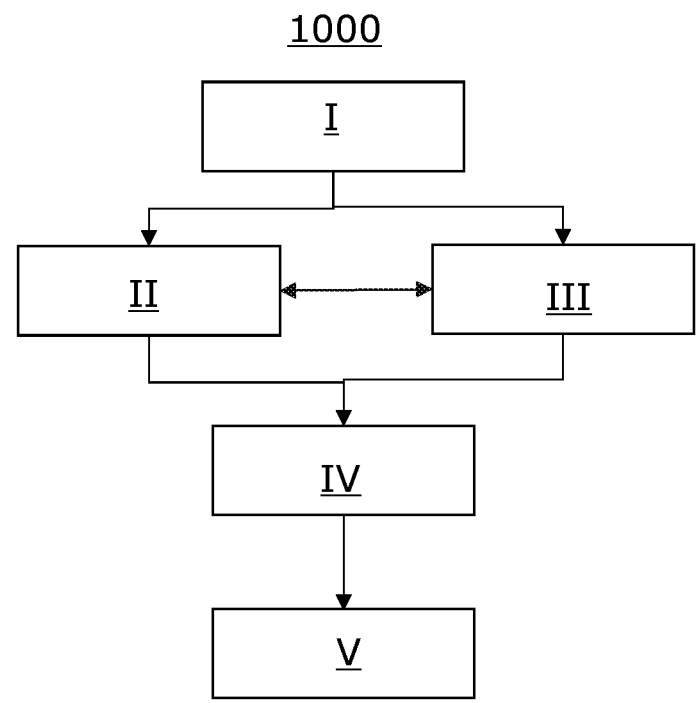
FIG. 1A illustrates a computer-implemented method according to an embodiment.

In the following Detailed Description, reference is made to the accompanying drawings, which form a part hereof, and in which is shown by way of illustration specific embodiments in which the invention may be practiced. In this regard, directional terminology, such as "top", "bottom", "front", "back", "leading", "trailing", etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Reference will now be made in detail to various embodiments, one or more examples of which are illustrated in the figures. Each example is provided by way of explanation and is not meant as a limitation of the invention. For example, features illustrated or described as part of one embodiment can be used on or in conjunction with other embodiments to yield yet a further embodiment. It is intended that the present invention includes such modifications and variations. The examples are described using specific language which should not be construed as limiting the scope of the appending claims. The drawings are not scaled and are for illustrative purposes only. For clarity, the same elements or manufacturing steps have been designated by the same references in the different drawings if not stated otherwise.

According to an embodiment of a computer-implemented method, the method includes receiving a program code comprising a sequence of array instructions for at least one input array data structure storing multiple elements of a respective common data type, and function meta information. The function meta information allow for determining an output size information of an output of each array instruction of the sequence of array instructions for an input size information of the at least one input array data structure. From the program code, a first program segment is generated. Generating the first program segment comprises: determining a runtime size information of a respective runtime instance of the at least one input array data structure, and including, from the sequence of array instructions and based on the runtime size information, the function meta information and the array instructions, array instructions into the first program segment as corresponding array operations.

The method further includes receiving hardware information of a processing unit; compiling, based on the first program segment, the runtime size information and the hardware information, a first compute kernel which is executable on the processing unit; and executing the first compute kernel on the processing unit using the runtime instance of the at least one input array data structure as input.

The method allows for particularly efficient execution of user program code with array instructions on the processing unit(s) and efficient mapping of chunks of workload to the available hardware resources, respectively, with at most only little, typically without any manual adaption.

This is partly because the first compute kernel is compiled based on the runtime size information and the hardware information. Accordingly, all information desired for optimizing the compute kernel on the given hardware and data can be taken into account.

In particular, any desired information influencing the decision of the best execution strategy may be taken into account. This includes information regarding the actual array data to be processed (runtime size information of runtime instance(s), the algorithm describing the processing steps (function meta information of the array instructions) and hardware information.

Since these components often expose a high variation and a great complexity, it is hard or even impossible to find the best execution strategy at compile time—prior to executing the algorithm on the target machine with the actual input array data.

For example, variations of the hardware can be observed when considering various types of processing units, in the following also referred to as PU's, commonly found today. For example: CPUs, GPUs, and accelerating processor devices all come with various flavors and individual properties. They vary in the number of sub-processing units, as number of cores, number of floating-point units, clock frequency, length of vector registers, ability for executing a single instruction with multiple data (SIMD), and many more.

The hardware information may include at least one of: a type of the processing unit(s), a number and/or a type of computational subunit(s) of the processing unit(s), such as SIMD processing units, a frequency of a processor, a capability of executing a number of floating point instructions per time interval, a number of similar or equal instructions to be executed together or in parallel, such as vector register lengths, a transfer speed for data, a storage capacity, such as cache size, and a capability to process certain operations more efficiently, such as merged multiply-add or processor intrinsic(s).

Variation of the hardware typically continues when considering higher-level processing units, as individually configured nodes of a cluster/a cloud/a network of computers. Besides the variation inherent to each individual heterogeneous computer system variation, of course, is also introduced by the ability, requirement or the wish to execute a program on multiple, several, different computers and/or on another version thereof.

Receiving the hardware information of the processing unit may include receiving hardware information of a first sub-unit (also referred to as first sub processing unit) of the processing unit, and receiving hardware information of a second subunit (also referred to as second sub processing unit) of the processing unit.

Alternatively or in addition, receiving the hardware information may include receiving hardware information of a first processing unit, and receiving hardware information of a second processing unit.

Likewise, variations in the input array data may be observed when executing the program code with different input array data and/or with input array data of a different size. Note, that the term 'input array data' as used herein encompasses intermediate array data, resulting from sub-program parts on certain algorithmic branches within the program code.

Variations in the algorithm may stem from the need to lower the high-level user program code into (array) instructions, which are understandable by the processing unit responsible for executing code. Commonly, individual categories and/or types of processing units require the use of individual instruction sets and, moreover, individual strategies to approach such execution. For example, to add 100.000 numbers on a CPU, using a single core requires a different approach than adding the same numbers on multiple cores of the same CPU and/or using vector registers, for example AVX. A further, different approach may be required to add these numbers using a GPU on the same computing system.

The computer-implemented methods described herein are in particular applicable to program code written in common array-based language implementations used today and especially useful for programs requiring great efficiency and compatibility to varying hardware and/or data sizes.

Note that array-based program algorithms are popular in the scientific community and many industrial branches. Two array-based programming languages most common today are Matlab (by Mathworks Inc.) and numpy (based on the python language). Another example is the ILNumerics language, available for the .NET platform.

In contrast to general algorithms, which use scalar data of various types as elementary item in their instructions, array-based languages use input array data structures as elementary data items. Arrays typically expose a rectilinear structure. Elements of arrays may be arranged along an arbitrary number of dimensions and are typically all the same type, typically a numerical data type, for example the 'double' or the 'int' data type in the C language.

A matrix is one typical example of an array, having 2 dimensions. A set of equally sized matrices can be stored as a 3-dimensional array. The term 'tensor' refers to an abstract mathematical structure of similar, n-dimensional shape. An n-dimensional array can be understood as a tensor, being stored on a computer storage. Due to the storage requirement and since for such storage commonly 1-dimensional computer memory is used, additional information is desired in order to fully represent an array—compared to a tensor: the storage layout describes how individual elements of an array are accessed by means of 1-dimensional storages.

The term 'stride' as used herein intends to refer to the information about the storage layout of a multi-dimensional array. Typically, strides are stored with the array, commonly in a header part of the (input) array data structure. The stride value for a dimension commonly specifies a storage distance for elements stored within that dimension. Stride values are often unitless, with a scaling factor of the storage size for a single element of the array element type or 1 for byte distances.

Note, that the set of potential array shapes also comprise vector shaped arrays, where the vector may extend along an arbitrary dimension of the array, often along the first or the last dimension. Some languages allow scalar data (0-dimensional array), storing only a single element. Some languages define a minimum number of dimensions for an array and store scalar data as matrices or arrays of at least that minimum number of dimensions, where all dimensions are 'singleton dimensions', having the length of 1. N-dimensional arrays may have zero elements if N is greater than 0 and at least one of its dimensions has 0 elements. If N is 0, typically and by convention, the array is scalar, i.e.: it stores exactly one element.

The runtime size information may include at least one of a number of dimensions of the respective runtime instance, a length of at least one of the dimensions of the respective runtime instance, a data type of the elements of the respective runtime instance, a location information of the respective runtime instance, and a stride information of at least one of the dimensions of the respective runtime instance.

The term "function meta information", in the following also referred to as FMI, as used herein intends to describe a data structure or functional data structure, able to programmatically inform about the output size, shape and potentially other properties of an output of an array instruction or even a sequence of array instructions, given the respective information about the input of the array instruction(s). Typically, for this method to work, each array instruction associates a respective (individual) FMI, for example a (code) attribute (see: C #Attribute class). Alternatively, each array instruction associates a class of predefined FMI or a compiler matches known array instructions or known classes of array instructions with predefined FMI.

The function meta information of the program code typically refers to the sequence of array instructions. The FMI of the program code may in particular includes a corresponding (individual) function meta information for each of the array instructions of the sequence.

In the following, an FMI referring to one array instruction only is also referred to as array instruction meta information and AIMI for short. An AIMI is typically configured for programmatically informing about the output size, shape and potentially other properties of an output of an array instruction, given the respective information about the (at least one) input of the array instruction.

In particular, the FMI of the program code may include or even consists of an AIMI for each array instructions of the sequence, for example a set of AIMI.

Including the array instructions into the first program segment as corresponding array operations may include, into the first program segment, the corresponding array instruction meta information for each of the array instructions. Accordingly, executing the first compute kernel on the processing unit may be facilitated.

This typically also applies to other program segments that may be generated, in particular the second program segment explained below.

Accordingly, the generated first program segment, typically several or even each generated program segment may include (respective) array operations and corresponding array instruction meta information (for each respective array operation).

Each array instruction meta information typically allows for determining an output size information of an output of the respective array instruction for an input size information of an (at least one) input array data structure of the respective array instruction.

The function meta information (of the program code) typically includes at least one of a size information, an element type information, and a layout information for each of the array operations, typically the size information and an element type information.

More typically, the function meta information (of the program code) includes an AIMI for each array instruction of the sequence, wherein each AIMI includes at least one of a size information, an element type information, and a layout information for the respective array operation, typically the size information and the element type information.

FMI and AIMI, respectively, often comprise at least one of: a function, receiving input data information, a predefined function, a function which is built and/or compiled by the compiler in a compilation step at compile time—or at runtime.

An AIMI (individual FMI) is commonly associated with an array instruction. A compiler according to this method often accumulates multiple array instructions into a segment, also combining their respective AIMI into a segment FMI, typically within a segmenting step (for an example see also step 26 below).

As described in the application WO 2018/197 695 A1, the FMI may additionally include effort information referring to a first numerical effort factor for executing the respective array instruction with a scalar input data structure instance and/or one element of the respective common data type on a processing unit having the same type or category as the first (sub-) processing unit, and a second numerical effort factor for executing the respective array instruction with the scalar input data structure instance and/or one element of the respective common data type on a processing unit, having the same type or category as the second (sub-) processing unit.

Further, the FMI and the runtime size information is used to numerically calculate first expected costs of performing the array instructions of the first program segment with the respective runtime instance on the first (sub) processing unit, and to numerically calculate second expected costs of performing the array instructions with the respective runtime instance on the second (sub-) processing unit.

Even further, the first (sub) processing unit may be selected as the processing unit for which the first compute kernel is to be compiled and on which the first compute kernel is to be executed if the first expected costs are lower than or equal to the second expected costs. Otherwise, the second (sub) processing unit may be selected as the processing unit for which the first compute kernel is to be compiled and on which the first compute kernel is to be executed if the first expected costs are higher than the second expected costs.

Compiling the first compute kernel may in particular includes determining, based on the hardware information of the first subunit, the hardware information of the second subunit, and the FMI, from the runtime instance of the at least one input array data structure instance a first partial input (array) data structure instance referencing a first part of the runtime instance and a second partial (array) input data structure instance referencing a second part of the runtime instance so that costs of executing the array instructions are expected to be lowest when the first subunit performs the corresponding array operations of the set of array operations using the first partial input data structure instance as input, and when the second subunit performs the corresponding array operations using the second partial input data structure instance as input.

Accordingly, workload may be particularly well distributed.

The first compute kernel may be compiled to be executable on the first subunit and on the second subunit, in particular if, according to the hardware information, the first and second subunits are of the same type and/or have the same computational characteristics, and/or according to the FMI (AIMI), a size information of the first partial input data structure instance equals the corresponding size information of the second partial input data structure instance.

Further, a second compute sub-kernel of the first compute kernel may be compiled, the second compute sub-kernel being executable on the second subunit of the processing unit.

Since a compute kernel corresponds to a segment, compute kernels are in the following also referred to as segment kernels (and kernels for short). Note that compute kernels as described herein may, in some embodiments, be derived from the respective program segment similar as described in WO 2018/197 695 A1 for deriving the compute kernels in the runtime segments from respective program segments.

Including the array instructions (to generate the first program segment and during segmenting, respectively) as corresponding array operations typically includes at least one of:
  including a set of array instructions, in particular a subset of array instructions from the sequence of array instructions into the first program segment as corresponding array operations,
  using the function meta information and the runtime size information to determine a respective runtime output size information of the array operations,
  including a reduction array instruction as a reduction array operation,
  including a unary array instruction as a unary array operation,
  including an array access instruction as an array access operation,
  converting a scalar iteration variable of a looping instruction over at least one array access instruction for an (input or derived) array data structure corresponding to or being derived from the at least one input array data structure into an index data structure referring to multiple loop iteration index values produced by the looping instruction and using the index data structure instead of the scalar iteration variable with the array access instruction, and
  including a binary array instruction as a binary array operation into the first program segment.

More particular, user program code including array instructions from the set of functional language elements, in particular from the ILNumerics language may be received.

Such instructions typically correspond to the following categories of functions/instructions, which are similarly found in other array-based languages, sometimes referred to as and including 'map-reduce' type operations:

Unary function, mainly receiving a single array argument.
Example: sin(A) for computing the sine of elements of an input array A. The size and/or shape of the output commonly corresponds or equals the size of input A.

Binary function, mainly receiving two array arguments. The size and/or shape of the output commonly corresponds or equals the broadcasted size of both input arguments.

Here, the term broadcasting refers to the established way of handling multiple, different array shapes in binary operations (see: 'broadcasting operation' in numpy or ILNumerics and 'compatible array sizes' in Matlab). In short: the sizes/shapes of two arrays are considered broadcastable, if the length of all corresponding dimensions either match or at least one of the dimensions is of length 1. The length of a dimension of the output equals the maximum value of the corresponding dimension lengths of the first and the second input.

EXAMPLES 1. add(A,B) for computing the elementwise sum of two arrays A and B;
2. max(A,B) for computing the elementwise maximum of element values of two arrays A and B;
3. lt(A,B) for identifying element values of A being lower than values of corresponding elements of B for two arrays A and B.

Reduction function, mainly receiving a single array argument. Reduction functions may receive another argument controlling the axis or dimension along which the reduction operation is to be performed. Often, such axis is fixed by providing a constant value as axis argument. Or, the function may select the reduction dimension according to a predefined default value, often the first non-singleton dimension found in the set of dimensions of the first input argument.

EXAMPLES 1. sum(A, 1) for computing the sum of all elements stored within the second (0-based index #1) dimension of an array A.
2. any(A, 3) for detecting existence of any non-zero valued element along the fourth (0-based index #3) dimension of an array A.

Access to array values may be enabled by array access instructions. Array access references single/individual elements, parts/ranges of elements within certain dimensions of the array, individual elements addressed by indices, or mixtures thereof. Array access is possible by variables, too: A[i, k] reads the element at row i, column k, where i and k may be scalar, integer variables defined and initialized in advance by the user code.

The method may further include determining the respective sizes of runtime instances of the input array data structures of the binary array instruction, and including the binary array instruction as the binary array operation into the first program segment if all sizes match or if at least one of the runtime instances of the input array data structures to the binary array instruction meets a complexity criterion (e.g. is below a complexity threshold or is an array access instruction), and ending generating the first program segment otherwise.

Generating the first program segment may also be ended depending on (computational) cost of the first program segment.

Further, it may be verified, prior to including an array instruction into the first program segment, if including the array instruction results in a first program segment with lower or equal computational cost than a sum of computational costs of the first program segment without the array instruction to be included and computational cost of a new program segment only comprising the array instruction to be included, ending generating the first program segment otherwise.

Generating the first program segment may also be ended when an array instruction is found, whose output size depends on an element value of at least one of its input data or if an unknown instruction is found.

Generating the first program segment is typically also ended after including a reduction array instruction, if the reduction array instruction is, based on the FMI and the runtime size information, determined to produce one output element, for example a scalar array with the only element having the value zero.

After ending generating the first program segment, a second program segment may be generated from the program code, typically in at least substantially the same way as described for the first program segment.

In particular, the second program segment may be generated from the sequence of array instructions and based on the runtime size information, the function meta information and the array instructions. In particular, one or more remaining array instruction may be included into the second program segment as a corresponding array operation, more typically a set of remaining array instructions. Further, a deferred-merge array operation that may result from including a reduction array instruction as reduction array operation during ending generating the first program segment may be added to the second program segment (as first array instruction).

The runtime size information for a respective runtime instance, in particular a size information, may be determined by a further program segment or based on the FMI of a further program segment, in particular a previous program segment, typically prior to executing the respective compute kernel of the further program segment.

Likewise, an output array structure instance resulting from executing the first compute kernel on the processing unit, in particular the first output array structure instance may be used as input (array) data structure instance of a further, e.g. the second compute kernel compiled based on the further, e.g. second program segment generated from the program code.

A location information of the respective runtime instance of an input array data structure instance may be determined based on the second program segment or another further program segment, often starting with a deferred-merge operation.

As already explained above, the respective program segment is typically generated by at least one compiler.

Note that some known compilers can optimize kernels (sometimes referred to as part of a 'runtime segment') or similar low-level code for execution on certain PUs to a certain extent. Sometimes, JIT compilers create a weakly or not optimized version first and may replace the result with an even better optimized version later on. However, the scope of the source for such compilation units (for example: a function, intermediate language instruction(s), a program segment or a certain set of array instructions), so far remains the same and/or does not consider runtime information, at least not for segmenting the program code. In difference to that the methods described herein allow for optimizing the span of instructions a program segment comprises (source scope of kernel compilation)—at runtime and when all relevant information is available.

Further, several program segments are typically generated from the program code, in particular a sequence of program segments may be generated, sometimes interleaved with unmodified parts of user code.

Accordingly, a corresponding compute kernel may be compiled for each of the program segments.

Further, the compute kernels may be executed on the (sub-) processing unit(s).

According to an embodiment, segmenting of received program code, i.e. generating, from the received program code, respective program segments, includes determining the runtime size information of respective runtime instance(s) of the input array data structure(s); and including, from the sequence of array instructions of the received program code and based on the runtime size information, the hardware information of processing unit(s), the function meta information and the array instructions, array instructions into the respective program segment as corresponding array operations.

Likewise, one or more compilers may be configured to perform such a segmenting. In particular, a (corresponding) computer program product and/or a computer-readable medium may include instructions which, when executed by a computer cause the computer to carry out the process of segmenting a received (user) program code as described herein, and typically also to compile respective compute kernel(s) which is/are executable on the processing unit(s).

Note that the hardware information is typically used for compiling, but may only be used for certain processes during segmenting such as ending a segment and/or for deciding if an array instruction is to be either included into a currently generated program segment or into a further program segment.

The respective program segment is typically generated (in particular by a first compiler or compiler stage) as an intermediate representation, in particular a byte code representation.

The respective compute kernel is typically compiled by a Just in Time (JIT)-compiler, typically running on the computing system, e.g. a computer, providing the processing unit(s).

For this purpose, the JIT-compiler typically compiles (in particular as a second compiler), based on the respective program segment(s) received as corresponding intermediate representation, the runtime size information and the hardware information, the compute kernel(s) executable on the processing unit(s).

Note that the JIT-compiler may compile/recompile (new) compute kernel(s), e.g. when the runtime size information (of the runtime instance(s) to be processed) changes.

However, the recompiling step may also be dispensed with, if the runtime size information does not change significantly, more particularly if the additional compiling costs are expected to exceed the achievable further cost reduction during running the compute kernels, for example, if only a length of a dimensions of a respective runtime instance changes by less than e.g. a few percent, and/or if the already compiled kernel is suitable to handle input array instances of variable dimension lengths (kernel specialization).

The first compiler may run on the computing system providing the processing unit(s) for executing the array instructions, but also on a different computing system.

Further, the functionality of the first and second compiler may also be provided by one compiler (running on the computing system providing the processing unit(s) for executing the compute kernels).

For this purpose, the computing system(s) used for generating the program segment(s) and compiling the compute kernel(s) typically has/have access to, more typically include(s) a non-transitory computer-readable medium storing respective instructions for generating, from the program code, program segment(s), and compiling respective compute kernels as described herein.

Accordingly, a computer program product and/or a non-transitory computer-readable medium typically includes instructions which, when executed by at least one processor (e.g. a processing unit) of a computer cause the computer to carry out the methods explained herein, at least up to and including the processes of compiling the compute kernels.

Thus, a respective compiler infrastructure may be provided for generating improved or even optimized compute kernel(s) from program code with array instructions.

For generating the respective program segment(s), which is also referred to as segmenting for short—even it may include compiling processes of forming an intermediate representation, the following processes are typically performed (by the at least one compiler):
- analyzing the program code;
- generating an abstract syntax tree (AST) for the program code;
- generating an empty segment for the respective program segment;
- inspecting an abstract syntax tree (AST) of the program code; and/or
- including a node found in the abstract syntax tree (AST) into the respective program segment The methods described herein typically accommodate an efficient domain specific language (DSL) implementation. Commonly, such DSL comprises array data types, capable of efficient memory management. For example, arrays in the ILNumerics mathematical DSL can store element values on all PUs/memories associated with a PU. The set of PUs or their respective memories where array data is stored (location information) is a property of the array (runtime information) and maintained during execution throughout the lifetime of the array.

While array data may be stored on multiple PU's memory at the same time, in the remainder of this application we will assume exclusive storage locations on any one PU memory, if not stated otherwise. This restriction does not limit the general applicability of the methods described herein. It is introduced for simplicity reasons and to decrease the complexity for demonstrating the method.

The user code at least mainly written in a DSL may be embedded in a host language such as C #or Visual Basic. The host language typically provides common means of looping or iterating over parts of code.

The following C #example describes a loop iterating over the elements of the 4th row of a matrix A, replacing the value of each element with the result of computing the sine from the current value:

```
for (int i = 0; i < A.S[1]; i++) {
    A[3,i] = sin(A[3,i]);
}
```

Such loop can also be efficiently handled by the methods described herein.

Compiling the compute kernel(s) typically includes at least one of, more typically several of, and even more typically all of the following processes:
- determining a workload of the respective program segment based on the runtime size information of the respective runtime instance and the FMI;
- determining a respective portion of the workload to be processed by the first subunit and the second subunit;
- using the hardware information to determine a respective computational capacity for the first subunit and the second subunit;
- determining a size of the first partial input (array) data structure instance and a size of the second partial input (array) data structure instance according to the computational capacities for the first and second subunits;
- creating the first partial input data structure instance and the second partial input data structure instance;
- using the first partial input data structure instance as input of the first compute kernel executed on the first subunit of the processing unit;
- using the second partial input data structure instance as input of the first compute kernel executed on the second subunit of the processing unit; and
- assembling a first output of the first compute kernel executed on the second subunit and a second output of the first compute kernel executed on the second subunit to form a first output array structure instance.

The term "workload" as used herein refers to a measure of the overall number of elementary, numerical operations at least required to transform a certain set of input data (more particular input array data) into the desired result. Elementary instructions typically include scalar mathematical operations: addition, subtraction, multiplication, division, negation, comparison operations yielding a Boolean value (true/false).

Often and for practical implementations of numerical algorithms a processing unit executes further support-, control-, or management instructions in order to execute an elementary instruction on a specific processing unit (PU). For example, the elementary instruction plus ('+' or addition) on two scalar, numerical input data a and b can be performed by most modern processing units within one single clock cycle. However, this requires the data to be available within associated registers already. Loading the data into respective registers often requires further instructions, hence further clock cycles are spent by the PU.

Some systems using the methods described herein may acquire, consider and/or maintain at least one value, for example an average summand value, for such overhead, sometimes for each processing unit or for each processing unit type or kind and/or each elementary instruction type or -kind individually. However, often implementations neglect such overhead in the determination of a value for the workload, without rendering the method non-functional.

An idealized processor is an imaginary processing unit which does not incur any overhead in order to execute useful, elementary instructions. A workload is typically derived from or associated with specific user code instructions or instructions or operations derived thereof, and from/with specific input data. A workload is considered device independent. A workload value is commonly not associated with nor does it relate to a certain hardware device or processing unit, nor does it consider specific hardware capabilities.

In the following, if not stated otherwise and for simplicity reasons only, workload values are computed based on the simplifying assumption of individual processing units being idealized processors.

The workload of an array instruction or a sequence of array instructions is understood as the sum of the elementary instructions required to transform the input array data in accordance with the array instruction(s), in particular a sequence or set of array instructions into the desired result. Note that some array instructions can expose different characteristics regarding instruction workload and/or workload for computing a single element, when compared to other array instructions.

For example, the elementary instruction plus (or add or '+') may, for a given hardware (computing system), be associated with an exemplary workload (value) of 1, corresponding to a single floating-point operation. Hence, the array instruction add(A,B) (for adding the corresponding elements of two input arrays A and B) will be associated with a workload according to the number of elements of the output produced (potentially performing broadcasting), multiplied by 1.

For the same hardware, the more complex instruction sin(a), for computing the sine of an input number a, may by associated (by a least one compiler) with a workload value of 100, corresponding to the fact, that multiple elementary operations are required to be executed to compute the sine (on the same computing system). The number of 100 for example can be found by experience, by heuristic, by look-up tables, by measurements or by specification of certain processing units.

Hence, in this example, the array instruction sin(A), for computing the sine of each element of an input array A may be associated with the workload value corresponding to the number of elements in A multiplied by 100.

Likewise, for the same hardware, the workload W of the array reduction instruction sum(A,0), for reducing the elements along the first dimension of A to produce the sum of the values of these elements, may be associated with a workload according to the following formulae:

$$W=1*(A.S[0]-1)*A.NumberOfElements/A.S[0].$$

Here, the leading factor 1 corresponds to the exemplary workload of the elementary instruction add(a), inherent to the sum( ) array instruction. The second factor (in parentheses) corresponds to the number of additions performed along the elements in each column of A (when A is displayed as a matrix). The product formed by these two factors corresponds to the workload for one single output element. The third factor corresponds to the number of elements produced by the array instruction sum(A).

Note, that above example considers workload computation based on an idealized processor.

In many implementations of the method workload values have the unit 'floating point operations' (FLOP or FLOPs), especially, if at least one of the input data is a floating-point number (see, e.g.: IEEE754) and/or if the system recognizes or utilizes dedicated floating-point units for processing (see, e.g.: x87 numeric processor extension, NPX). For non-floating-point operations (for example: integer numbers or comparison operations) more general measures or units may be used, for example: low level operations, or clock cycles required for executing the operation.

Typically, in particular for reasons of efficiency it is more important to determine and use workload values for elementary operations which represent and retain the relative workloads according to the ratio of low-level operations actually required for processing among individual operations, instead of exact absolute values. However, the efficiency is typically improved by using more exact elementary workload measures.

The term 'cost' as used herein is typically used synonymously to the terms 'computational cost' and 'expected cost' and intends to describes a quantity or measure of time and/or energy (used for executing the compute kernel(s)). Often, cost relates to the minimal time or energy a processing unit (PU) is expected to spend in executing the compute kernel (executing array instructions, in particular a certain set of array instructions) and computing the result of a program segment including array operations, respectively. The term cost shall embrace the terms 'effort' and 'predicted minimal execution time' and typically considers the capacity or capability of a processing unit for executing instructions associated with a certain workload.

The cost of executing the instructions of a segment may (sometimes optimistically) be determined as the ideal or minimal time or energy spent, based on the maximum computing capability of the at least one processing unit. In this idealized view it is assumed that all computing resources of involved processing unit(s) are ideally addressed and utilized for computing the result (peak performance). This view often neglects at least some influencing factors, for example the overhead of data access by the processing unit and on various levels of the memory hierarchy, the complexity of determining an exact measure of utilization rate of a processing unit at any point in time during execution, the influence by other processes utilizing the system, the overhead of managing segment kernel code compilation and instantiation on various architectures involved.

Typically, respective costs corresponding to multiple processing units and/or subunits are calculated, used, and/or compared (by the compiler(s)). Such costs often consider the time at least required for executing the instructions assembling the workload of a segment on a respective processing unit. Often, the system considers a certain PU as an idealized processor.

While the workload for a certain sequence of array instructions is mostly independent from the hardware configuration of the particular computing system, the term cost describes a measure of time or energy required to execute instructions corresponding to a workload on a certain processing unit (or multiple processing units). Thus, the respective cost (value) depends on and relates to specific hardware properties.

Cost values are typically obtained as result of a cost model, commonly including further times or energy values, corresponding to processing parts, which significantly contribute to the overall time required for processing a segments workload, for example: data provision, including memory transfer time, may or may not including memory access and data storage times.

Other examples are further execution times, implied by managing-, control- or further instructions, for example: kernel generation and -compilation, overhead for cost determination. Some implementations prefer a simple cost model for cost determination over a more complex model, thus prioritizing simplicity of cost prediction over exactness. Other implementations prioritize a more exact cost computation and can sometimes achieve faster results. Some implementations can balance exactness for execution speed, sometimes even dynamically and/or at runtime.

The cost of executing a sequence of array instructions with certain input array data (runtime instances of the input array data structure) on a certain PU may be computed by summing the time for transferring the data to the PU and the time required to execute all elementary instructions assembling the workload of the array instructions with the input data on the PU, often assuming an idealized processor or based on measurements.

In particular, a PU may be instructed (by the compiler and/or via the compute kernel) to split the workload of a segment onto at least two of its subunits based on the costs. In this embodiment, the overall cost of processing the segments workload may be determined as the maximum value of the individual subunit costs.

Accordingly, the workload may be distributed in a way resulting in a particularly low execution time and/or a particularly low energy consumption.

With regard to FIG. 1A method steps of a computer-implemented method 1000 are explained.

In a block I of the shown flow chart with blocks I-IV each of which may correspond to one or more processes or steps, a program code with a sequence of array instructions input array data structure(s) storing multiple elements of a respective common data type, and function meta information, FMI, allowing for determining an output size information of an output of each array instruction of the sequence of array instructions for a respective input size information of the input array data structure(s) are received, typically by a compiler.

Figure 1B:
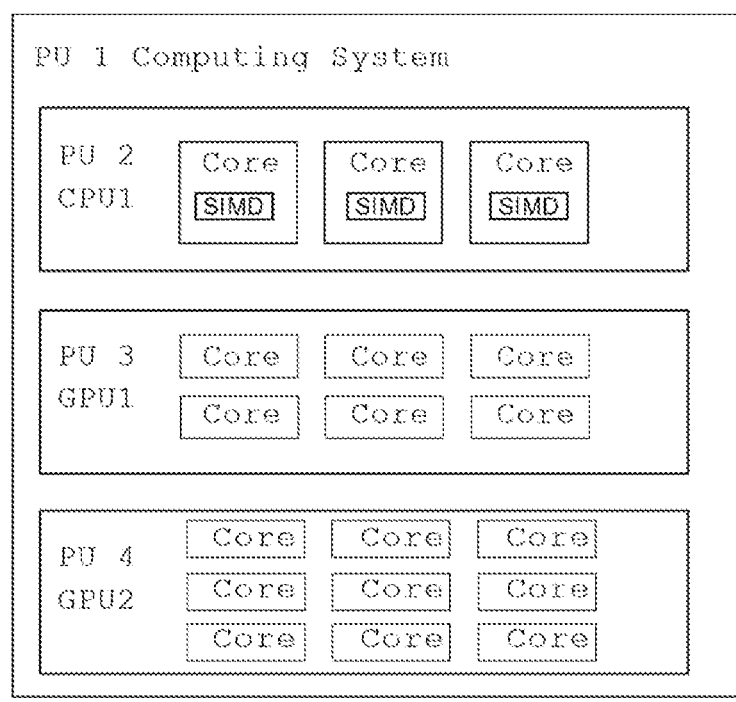
FIG. 1B illustrates an exemplary computing system for which the method shown in FIG. 1A may be used.

In subsequent blocks II, III, a (first) program segment is generated from the program code, and hardware information of a processing unit, for example a processing unit as shown in FIG. 1B, are received and/or determined, respectively.

In block II, runtime size information of respective runtime instance(s) of the input array data structure(s) to be processed are determined; and array instructions are, based on the runtime size information, the function meta information and the array instructions added from the sequence of array instructions to the program segment as corresponding array operations. As indicated by the arrow between blocks II, III, generating the program segment may also depend on the hardware information.

In a subsequent block IV, based on the first program segment, the runtime size information and the hardware information, a (first) compute kernel which is executable on the processing unit is compiled.

Thereafter, the compute kernel is executed on the processing unit with the runtime instance(s) as input.

Typically, a user program code is received and analyzed in block I.

Further, sequences of array instructions known to the compiler and associated with respective FMI may be located and included into one or multiple program segments.

Therefore, the method may inspect the runtime size information of a runtime instance of the input array data structure(s) and decide, based on the runtime size information, the function meta information and the array instructions, which instructions from a sequence of array instructions are to be included into a segment as corresponding array operations.

FIG. 1B shows an example computing system with a processing unit PU 1. In the exemplary embodiment, PU 1 represent the computational resources of a computing system, like the one, often found in a desktop computer, laptop or computing node of a computing grid or cloud system. PU 1 includes a CPU (as first subunit PU 2), and two GPUs (as second and third subunits PU 3, PU 4). Some of the PUs may be equipped with dedicated memory, often allowing fast access to data stored in it by the respective PU. Accessing data stored in the memory of other PUs on the system commonly requires longer access times. In some embodiments, some PUs share the same memory and/or the same address space.

In the computing system of FIG. 1B, PU 2, PU 3 and PU 4 are subunits of PU 1. PU 1 is called the parent unit of its subunits. Any processing unit can be the subunit of a subunit. Further examples of PUs are DSP, microcontroller and FPGA.

Often such a system comprises a host controller, like a CPU. Subunits typically are managed by the host controller, which may or may not resist on the same unit/device than the subunits it controls and/or is a processing unit itself. Commands, instructing a subunit to execute, compile and/or transfer data or code are commonly issued by the compiler of this invention, are send to the host controller, and are forwarded by the host to the processing unit addressed and selected for receiving and/or handling the command.

Sometimes, such commands are further translated by a further compiler or similar technology into instructions, specific for the processing unit addressed or at least one of its subunits. For example, an OpenCL kernel code is sent to an OpenCL capable PU and often translated (lowered) by a compiler, associated with the PU into instructions for the PU, a processor of the PU or a subunit of the PU is capable to execute, often binary instructions.

Typically, a processing unit exposes a hierarchical architecture, where smaller units are connected to work together as a larger unit. Hence, a processing unit may make available/provides or manages access to the computing resources of its subunits. Typically, the merged computing capabilities of a processing unit grow with the position of the PU within the nodes of the computing system hierarchy.

Some PUs are capable of executing control instructions, for example to determine hardware properties, to split workloads, prepare segment kernels, and/or to distribute data and/or instructions. Such PUs are called 'active' PU, for example: a single core of an Intel™ i9 CPU.

Other PUs are capable of executing elementary operations, for example preconfigured segment kernels. Such PUs are called 'passive' PUs, for example a streaming multiprocessor of the Nvidia GeForce GTX 280 GPU.

Commonly, the organizational structure of the computing resources/PUs of a computing system forms a tree of PUs, where the inner nodes of the tree represent active PUs, while the leaves of the tree represent passive PUs. Often, implementations of the method described herein utilize active PUs for segmenting, kernel preparation, workload distribution and dispatching, enqueuing and/or initiations of segment kernel execution, sometimes recursively, sometimes also kernel instructions execution. Passive PUs mostly execute kernel instructions. An active PU may also be used as a passive PU.

The computing capability or computational capacity of a PU is determined by specification of the PU vendor, by measurements or by configuration and can be queried at runtime by the compiler using an appropriate interface, often a driver or a standardized API provided by the vendor. For example, the computing capability of an AVX extension in a PU can often be determined by calling corresponding functions provided by the OpenCL API or via the CPUID x86 instruction.

Often, a useful measure for 'computing capability' or 'computational capacity' is the number of floating-point operations per seconds (FLOPS) a unit is capable to execute. Sometimes, for non-floating-point operations, a popular measure is: MIPS. A PU can inform about the accumulated computing capability it is able to perform, for example by accumulating the computing capabilities of its subunits and its own capability, if existing and if the compiler can address them all efficiently.

For example, a single core (commonly denoted as an active PU) of a CPU can provide the sum of the FLOPS of its subunits (often SIMD vector extensions, like AVX or SSE) plus the FLOPS value of its x87 unit, if existing. If, however, the compiler in a segment kernel addresses vector registers only, the x87 unit is not directly utilized for processing the workload and its FLOPS value may be ignored.

Figure 2:
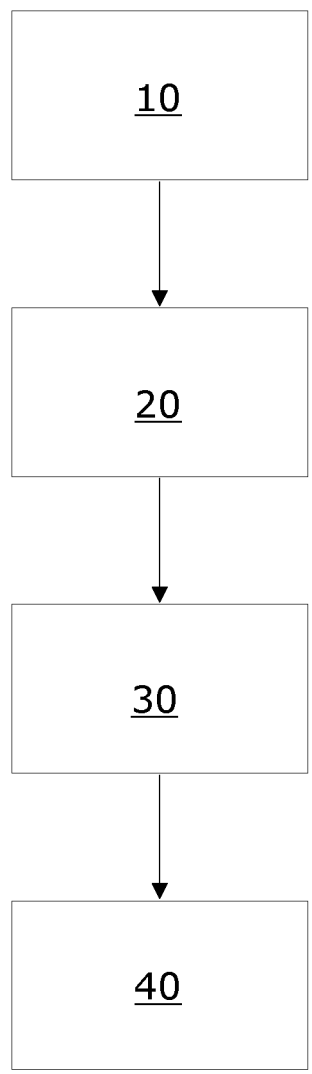
FIG. 2 illustrates a computer-implemented method according to embodiments.

FIG. 2 illustrates method steps of a computer-implemented method which is similar to method 1000 explained above, but more detailed as it refers to the following (partial) user program code UC:

```
for (int i = 0; i < A.S[1]; i++)
{
    classes[full, i]
      = argmin(sqrt(sum((A[full, i] - B) ** 2, dim: 0)), 1) *
        sin(C[full, i]);
}
```

The exemplary user code includes array instructions, locating for each data point in a data set, named A, the index of the nearest (L2 norm) data point in another data set, named B, multiplying each index found by the sine of data point coordinates in a third data set C and storing the result into the corresponding slot of a data structure, named 'classes'.

Note that this partial code is considered pseudo code, typically not a complete code to be executed, and was chosen for reasons of clarity as such. Typically, it is a part of a larger user program code with further instructions to be executable, which are not shown here. The exemplary user code is mostly based on elements of the ILNumerics and the C #languages, to demonstrate the method. It will be clear for a skilled person that the concrete names and syntax of such elements are specific to one language—but these details are not relevant for the described method to work. All array-based languages are applicable to the method described herein and provide similar language constructs which can be used instead of the elements shown in the exemplary example.

For example, the '' operator, denoting exponentiation of the left operand to the power of the right operand, does not exist in the C #language, but exist in the FORTRAN language. In the C #language, a user might use the pow( . . . , 2) ILNumerics language element instead. A compiler according to this method would understand the similarity in the semantic of both, ' 2' and 'pow(..,2)' and implement both, utilizing a 'squared' operation.

In a first block 10 (which substantially corresponds to block I in FIG. 1A), the user program code is received, and a part thereof is transformed into an abstract syntax tree (AST) or similar data structure for further, efficient analysis and manipulation.

Commonly, a compiler will receive the user code or a substitute thereof, for example, an intermediate representation as the output of another compiler, a manual translation or a data structure, representing the intended algorithm, for example XML code. Typically, the compiler inspects user code and parses individual array instructions, forming an abstract syntax tree (AST) from the instructions. In some implementations the AST or a modified version thereof serves as input to the compiler. In this case step 10 may be omitted.

Typically, a compiler may recognize only a subset of the instructions from the user code. An implementation, therefore, may create and/or handle multiple AST instances, according to the sequences of known, supported array instructions found. In later blocks of the method, such implementation can re-join the segments code into the user program to gain an optimized version of the user program. Therefore, segments are typically implemented (by the compiler) in the same language as the analyzed user code or are connected to the user code by means of external library calls.

In block 20 of FIG. 2 (which substantially corresponds to block II in FIG. 1A), the AST is transformed into segments. In the segmentation step 20 the compiler iterates array instructions and forms a first segment, comprising a sequence of corresponding array operations. The process is explained in more detail below with respect to FIG. 3.

In block 30 of FIG. 2 (which substantially corresponds to blocks III, IV in FIG. 1A) hardware information of a processing unit is received, and a compute kernel is compiled, respectively.

Figure 3:
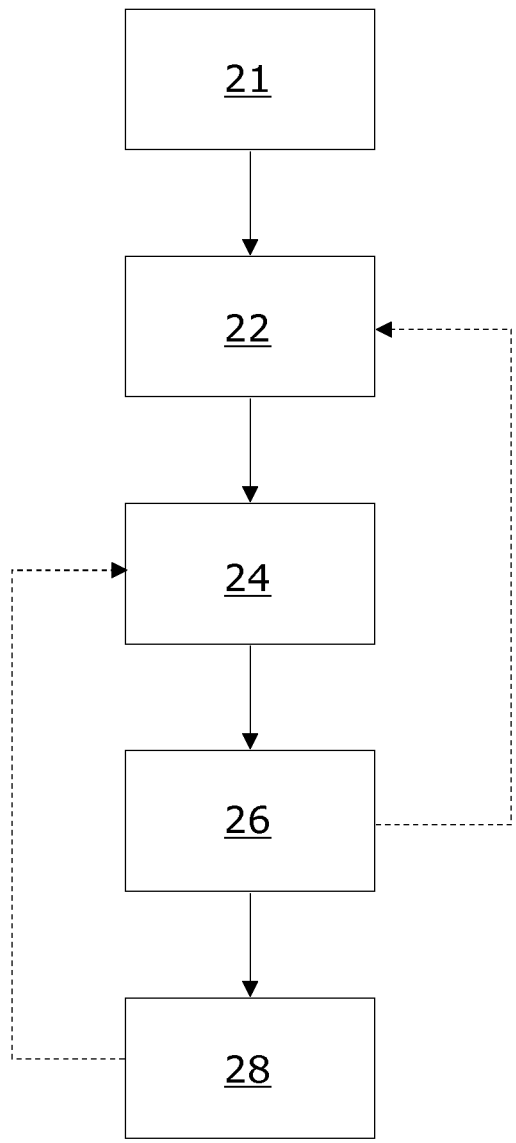
FIG. 3 illustrates a computer-implemented method according to embodiments.

In order to form a segment or multiple segments from the user code, the compiler commonly starts at a leaf of the AST of the user code, i.e.: array input data as illustrated in block 21 of FIG. 3. The leaves of the AST are formed by arrays, array access instructions, indexing instructions, or array view instructions. In other implementations only array access instructions may serve as a leaf. In such cases, indexing and view instructions on arrays must also be included into segments as array operations.

Figure 4:
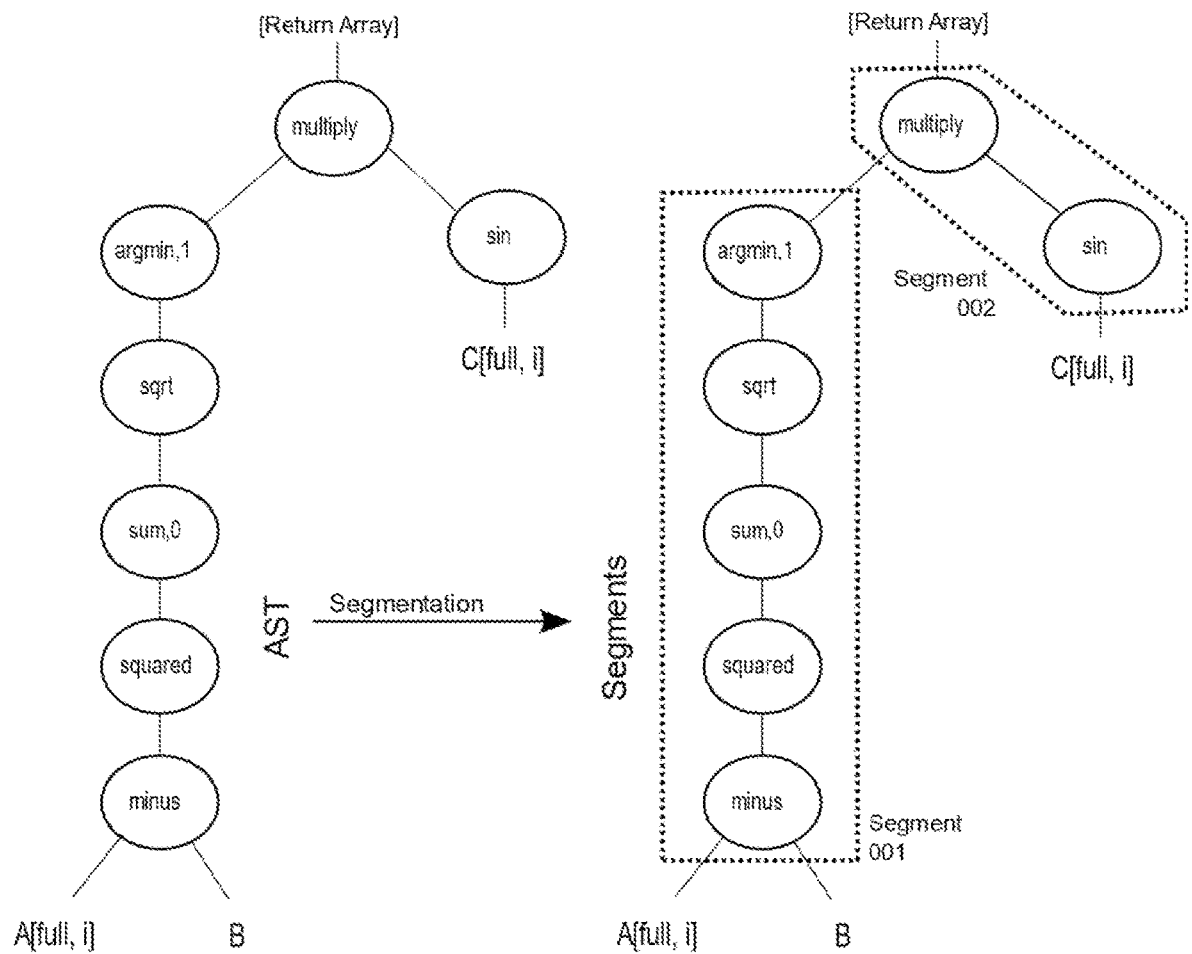
FIG. 4 illustrates method steps of a computer-implemented method and a heterogeneous computing system according to an embodiment.

FIG. 4 shows an exemplary AST, formed from the array instructions of the loop body of the above exemplary user code UC. Here, an exemplary embodiment is demonstrated, which does not include array access instructions as array operations.

In step 21 the compiler inspects input data related to the user code and properties thereof. Here, the input arrays A, B, and C are found. For demonstration purpose let's assume properties for these array instances as listed in following Table 1:

| | Number of Dimensions | Shape | Strides | Memory Location |
|---|---|---|---|---|
| A | 2 | [1000, 1000] | [1, 1000] | CPU |
| B | 2 | [1000, 500] | [1, 1000] | CPU |
| C | 2 | [4000, 1000] | [1000, 1] | GPU II |

Typically, the compiler selects a leaf to start iterating the nodes of the AST by locating a leaf associated with the longest path within the AST.

In the exemplary embodiment, the compiler starts analysis with the array view instruction A[full, i], extracting the column at index i from the array A. In a typical, efficient array implementation such extraction or array view does not introduce additional memory space for a copy of element values. The output array data structure of the array view serves as leaf of an AST branch of the user code.

Typically, the compiler starts with an empty segment and iterates the nodes up the AST, starting from the leaves of the AST and visiting potential array instruction nodes. At each node representing an array instruction the compiler decides whether to include the instruction into the current segment or to end the segment by creating a segment border.

In a segmenting block 22, the compiler selects a node from the AST formed in 10, typically in a post-order traversal.

For each of the nodes and in the next block 24 the compiler decides whether to include the array instruction corresponding to the currently selected node into the segment. Often it is necessary to delay this process from compile time to runtime, since the semantic or efficient implementation of many array instructions depend on the properties of its array arguments and on the concrete properties of the processing unit(s) used and/or available for executing the instructions.

Typically, the compiler tries to construct segments as large as possible. The more array instructions are included in a segment, the more workload is handled by this segment. Typically, a higher number of instructions included into a segment increases the ratio of computations per memory access and/or decreases the number of intermediate temporary array storages required to write and/or read the segments/the programs input/output data. Large segments are more likely to perform processor-bound computations or to expose an advantageous memory access pattern.

The method described here, also forces segments to be configured in a way that the compiler can distribute a segments workload efficiently to the processing-/subunits of a computing system and that the kernels for individual units can be implemented with aggressive optimizations applied.

By applying segmenting rules as described herein, a segments workload size can be computed prior to executing the segments operations. The complexity of a segment remains within certain limits, allowing for calculating in advance/predicting the number and/or type of elementary instructions required to execute the array instructions from the segment with the concrete array data structure(s)/runtime instance of the input array data structure. Also, the sequence of array instructions is typically limited by the compiler by trading off the cost for data array transfer operations between PUs or memories of PUs against the utilization of more/ faster PUs for executing array instructions.

The first node found in block 22 of FIG. 3 for the example shown in FIG. 4 is the array instruction minus. This node represents a binary array instruction. According to common array binary instruction semantic, the elementary binary instruction minus or '−' is to be applied to all corresponding elements of the left and the right input to the array instruction, considering broadcasting, where applicable.

Binary nodes may perform broadcasting if the size of both inputs is not equal and both input arguments have matching sizes. Two arrays can participate in broadcasting, if all corresponding dimension lengths from both input arrays match. The corresponding lengths of a dimension from two arrays 'match' if the lengths are the same or if one of the lengths has value 1. This concept is very popular and broadly known in numerical computing and for array based numerical languages.

In the context of this specification, missing dimensions are considered virtual dimensions, having the length 1. Dimensions of length 1 are called singleton dimensions.

During broadcasting the value from the singleton dimension of the one array will be repeatedly applied to the corresponding elements of the non-singleton dimension of the other array.

One purpose of segmenting is to optimize memory access overhead. One way is, to eliminate as many temporary array results between individual array instructions as possible. However, if broadcasting is performed, eliding temporary arrays may lead to repeated, redundant operations to be performed, for example by repeated computation of a value for the singleton dimension. Therefore, a compiler may implement a segment border when broadcasting is performed by a binary instruction.

A border between two segments typically introduces a temporary or intermediate array result of the first segment which serves as input to the second segment.

In the example, both inputs to the minus instruction are array access instructions. Often, directly reading values from array elements stored in a memory can be implemented as a relatively efficient operation compared to more complex operations, for example: computing the sine of a certain value or performing a reduction over many elements. The compiler, commonly, has a measure of complexity threshold configured, below which input values/expressions are considered "cheap enough" for repeated application in broadcasting operations.

For example, a simple compiler rule would only accept an array access instruction, as an array index instruction, and/or a full or partial array view instruction as input to such binary nodes, performing broadcasting. Or, deferred-merge operation (see below) results are accepted, too.

Often a better approach, using fewer intermediate arrays, is to introduce a segment border only on the binary input side, bringing in a singleton, broadcasting dimension. This can be observed from the binary multiply node further up the AST in the embodiment shown in FIG. 4. Note, that for more than two dimensions this approach may result in a segment border being inserted for both input branches to a binary instruction.

Figure 5:
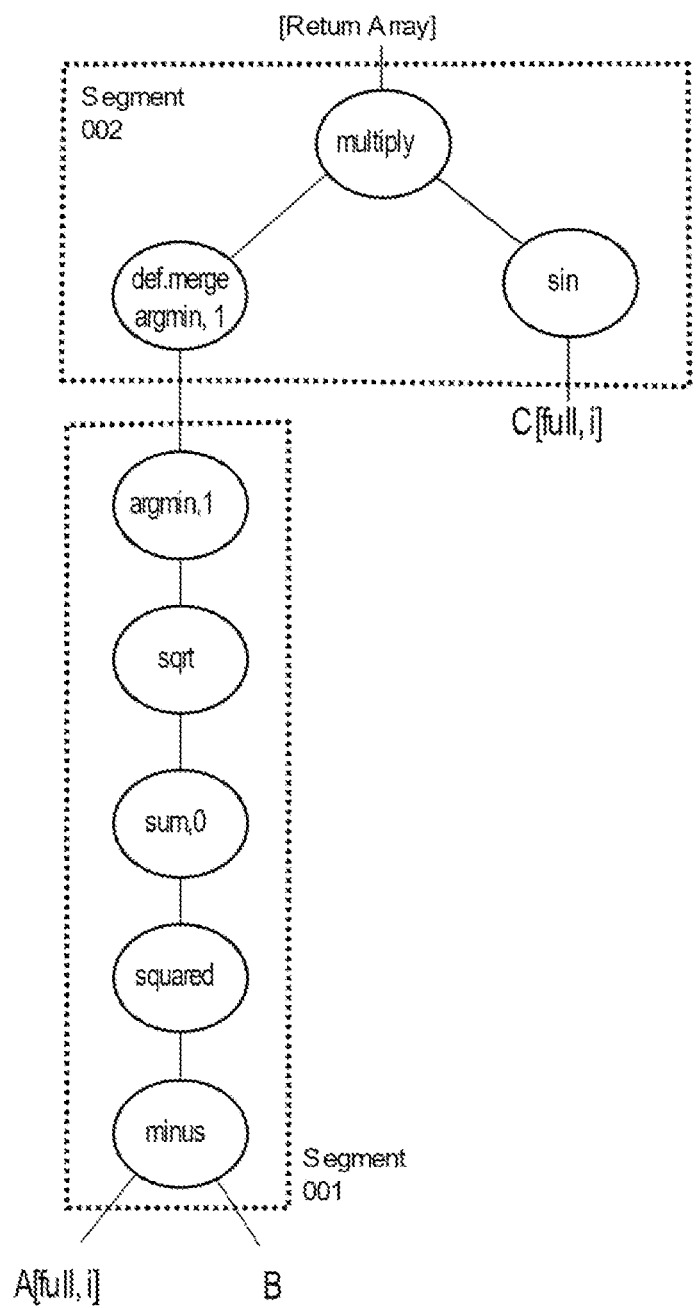
FIG. 5 illustrates method steps of a computer-implemented method according to embodiments.

In the embodiment shown in FIG. 5, the minus node is added to the segment in step 24 and the compiler proceeds with step 26. Here, accumulated FMI for all instructions currently included into the segment is updated. This way, the compiler can calculate the size/shape/properties of intermediate results for each intermediate array instruction within the segment/within the AST.

In this example and at this point of processing, the segment comprises of the minus operation only. The inputs A and B to the minus operation have the size [1000,1] and [1000, 500] respectively. The output has the size [1000,500], according to broadcasting rules.

The segment's FMI can subsequently be updated with each new array instruction included by the compiler while building the segment. Or, they may be built for multiple or all array instructions from the AST at once. In this embodiment, requests for output array properties (such as the size/shape/layout) are accommodated by an additional parameter/information selecting the instruction/the set of segment operations to query output information for.

Advantageously, the accumulated FMI for a certain segment may be cached and reused for subsequent segments having the same segment borders and containing the same array operations or for the same segment being later reused.

Another, especially efficient method to calculate the size/ shape of intermediate operation results is to directly update the data size information structures of each output array instance to the segment with each array instruction inspected and/or included into the segment, using the individual FMI of the array instructions.

Following block 26 control may be returned to block 22 in FIG. 3. The parent node of the current AST node is considered. Accordingly, the compiler finds the squared node. This node is an unary instruction, performing a 'map' kind of operation. This instruction will be included into the segment by the compiler in block 24 and control is given to block 26.

Block 26: The output of the squared operation in this example is of size [1000, 500].

Block 22: The next instruction up the AST is the unary reduction node sum. The reduction is performed along the axis/dimension 0, i.e.: it sums up element values along the columns of the input array instance.

Block 24: The compiler includes the sum reduction operation into the segment. It typically performs more checks which are described later.

Block 26: The sum reduction produces an output of size [1,500]. The segments FMI are updated accordingly, and control is given to step 22.

The next instruction is a map-type, unary instruction: sqrt. It is included by the compiler as unary operation and produces an output of the same size as its input: [1, 500]. The segments FMI are updated (block 26) and control is given to step 22.

The next instruction found (block 22) on the way up the AST is the argmin instruction, a reduction operation. It finds the index of the element having the smallest value among elements along the second dimension (zero-based index 1).

In block 24, the compiler may inspect the properties of the input to a reduction operation and implements the operation in later compiler blocks in an optimized way for certain array sizes. For example, if the specified reduction dimension/working dimension/reduction axis is of length 1, the reduction instruction can be marked for being implemented as a no-op in many cases.

In this example the output of the argmin operation has the size [1,1]. Hence, here, the intermediate result is scalar.

After a reduction operation is added to a segment in step 24 and the FMI is updated in step 26 some compiler implementations determine the execution strategy for the current segment's sequence of instructions for the current input data. Typically, such compiler considers all relevant hardware and data information to compute the predicted cost of executing the instructions on available processing units, individually and/or concurrently. Depending on the selected execution strategy the compiler in step 24 either proceeds with the next instruction up the AST (parent instruction) or a segment border is inserted (step 28) after the reduction operation.

If the compiler decides—in particular according to the prediction of shortest execution times—that for executing the segment in its current state with the input data instances would be best performed on a certain, single PU, a segment border is not required and the compiler proceeds with block 26.

If the compiler decides to split the segment workload along the current reduction dimension to produce chunk results on multiple PUs (see below) a subsequent segment border is introduced in block 28. In this case, the segment following the current segment is configured to start with a deferred-merge operation according to the current reduction operation.

FIG. 5 shows a deferred-merge operation in segment 002. Such operation completes the execution of a reduction operation R, carried out on multiple PUs/subunits.

It collects the results/outputs of the previous segment from the executing PUs and merges them, using the same elementary reduction operation as R to compute the final segment result. Typically, the chunk results are copied to the memory associated with the PU selected for executing the segment containing the deferred-merge operation. This selection is performed by considering the input data properties to the successor segment and/or the current hardware properties, including for example a utilization rate and/or transfer rate.

In the exemplary embodiment shown in FIG. 5, segment 002 includes the deferred-merge operation for the (split) argmin reduction operation ending segment 001. Since the compiler decided to split the workload for segment 001 the chunk results will be stored on multiple PUs. In preparation of executing the operations of segment 002 the compiler typically first decides for and selects the at least one target memory/PU for executing segment 002.

Typically, during the evaluation of predicted costs for executing segment 002 on available PUs, individually or concurrently, the compiler inspects input data properties, as size, shape and storage location and -layout. It typically decides to execute the segment on one or multiple PU(s), to minimize predicted costs, also considering data transfer times to a PU under consideration. If a deferred-merge operation is found in a segment the corresponding data input is disregarded from such data transfer cost determination.

Instead, the selected PU for the segment is used as the target PU for the deferred-merge operation. If, for example the compiler predicts fastest execution time when utilizing PU 4 (see FIG. 1B) to execute segment 002 (see input data from table 1), the deferred-merge operation from segment 002 will collect the chunk results from all PU memories utilized for computing segment 001, instruct PU 4 to complete the argmin reduction operation and store the result of size [1,1] to the memory associated with PU 4.

The result of performing a reduction R on the chunk results is commonly stored into a memory associated with the target PU, as selected by the current segment. Sometimes, especially when such result is small, the compiler may decide to elide the storage of the reduction result into a memory of the PU and to store it into a register or temporary variable defined in the kernel code for the segments instructions on a selected PU.

Typically, the result of a deferred-merge operation is scalar. This is because, if there would be other elements in the output, they can independently be used for computing— and for splitting the workload. Further, splitting of a working dimension may only be performed, if there is only one element produced by a segment and a reduction (working) dimension is to be split.

Commonly, the segment executing a deferred-merge operation selects the PU and an associated memory as the target for copying source chunk results to and to perform the final reduction of the chunk results. Typically, a deferred-merge operation is following a segment border following a reduction operation.

The next instruction found in block 22 in the AST in FIG. 4 is the binary multiply instruction.

In block 24 of FIG. 3, the compiler may inspect the left and the right input and determines their sizes. One goal is to determine, if the multiply instruction performs broadcasting. For the left input the size is found to be [1,1]. The right input size is evaluated by considering the right branch of the AST below the multiply node.

Typically, the inspection and the transformation of the AST into segments is recursively performed by the compiler. Here, a compiler is described, which performs transformation of the AST into segments by iterating the nodes of the AST in post-order, i.e.: an inner node is visited after having visited its children.

The right input branch size is found to be [4000,1]. Hence, broadcasting along dimension #0 is performed by the multiply node.

In this embodiment, the compiler has a complexity criterion configured, which introduces a segment border for all but array access instructions or deferred-merge operations on such binary nodes, performing broadcasting. In some implementations the compiler more accurately determines the effort of repeatedly accessing the same element value on the smaller input. It compares the cost of a repeated memory access to the same memory address with the effort to repeatedly perform the calculation according to the expressions defined by the input AST branch.

For example, consider a binary node, performing broadcasting of the inputs [1] and [10], mapping the value of the single element of the smaller input onto the 10 elements of the larger input. The value of the smaller input would have to be evaluated 10 times, but its value remains the same throughout the mapping operation. A segment border limits the effort to evaluate the single value to 10 times repeated memory access for reading the value from an intermediate array, introduced by the segment border.

In another embodiment, a temporary variable or register is introduced to cache the single value from the smaller input and to save repeated memory accesses. Such cache can elide the temporary array or a segment border in some cases. It often increases the complexity of the compiler and of the segment implementation in a kernel, specific for a selected processing unit, which must be considered by the compiler author during system design.

Sometimes, redundantly performing simple calculations can be less expensive than repeatedly or redundantly reading values from memory, especially, if such simple calculations can be mapped to and performed by specialized processor instructions.

Often, an efficient compiler performs further operations in block 24 to decide for a segment border. For example, inclusion of a binary instruction can increase the number of inputs to the segment. Hence, additional copy operations of corresponding input data array instances to the selected PU(s) can influence execution times.

For example, consider the user code 'sum(D)+E'. The sequence contains two array instructions: sum and plus. In an earlier segmenting block 24 the compiler already had included the sum instruction into a new segment. At this point, the sum operation is the only operation in the current segment.

The compiler can now inspect the parent node: plus. It then decides whether to include the plus instruction into the current segment or to introduce a segment border and start a new segment for the plus instruction. Both segmenting options are demonstrated in FIG. 6.

TABLE 2

| Hardware/devices properties | | |
|---|---|---|
| Transfer bus, PClv3x16, b/s | 1.50E+10 | |
| Devices considered | PU2(CPU) | PU4(GPUII) |
| Max FLOP/s | 3.00E+11 | 3.00E+12 |
| Data properties | | |
| Input arrays | D | E |
| Shape (elements) | [1000,1000,100] | [1000, 1000] |
| Size [bytes] | 8.00E+08 | 8.00E+06 |
| Location(s) | PU2 | PU4 |
| Instruction properties | sum | plus |
| FLOP count | 9.00E+09 | 1.00E+09 |
| Segmenting Options | | |
| Option1, segment 1 | | |
| FLOP | 1.00E+10 | |
| Costs | PU 2 | PU 4 |
| -Transfer [s] | 5.33E−04 | 5.338−02 |
| -exec [s] | 3.33E−02 | 3.338−03 |
| .PMET [s] | 3.39E-02 | 5.67E−02 |
| option1, total PMET [s] | 3.39E-02 | |
| Option2, segment 1 | | |
| FLOP | 9.00E+09 | |
| Costs | PU 2 | PU 4 |
| -Transfer [s] | 0.00E+00 | 5.338−02 |
| -exec [s] | 3.00E−02 | 3.00E−03 |
| .PMET [s] | 3.00E-02 | 5.63E−02 |
| Option2, segment2 | | |
| FLOP | 1.00E+09 | |
| Costs | PU 2 | PU 4 |
| -Transfer [s] | 5.33E−04 | 5.33E−04 |
| -exec [s] | 3.33E−03 | 3.33E−04 |
| -PMET [s] | 3.87E−03 | 8.67E−04 |
| option2, total PMET [s] | 3.09E-02 | |

Figure 6:
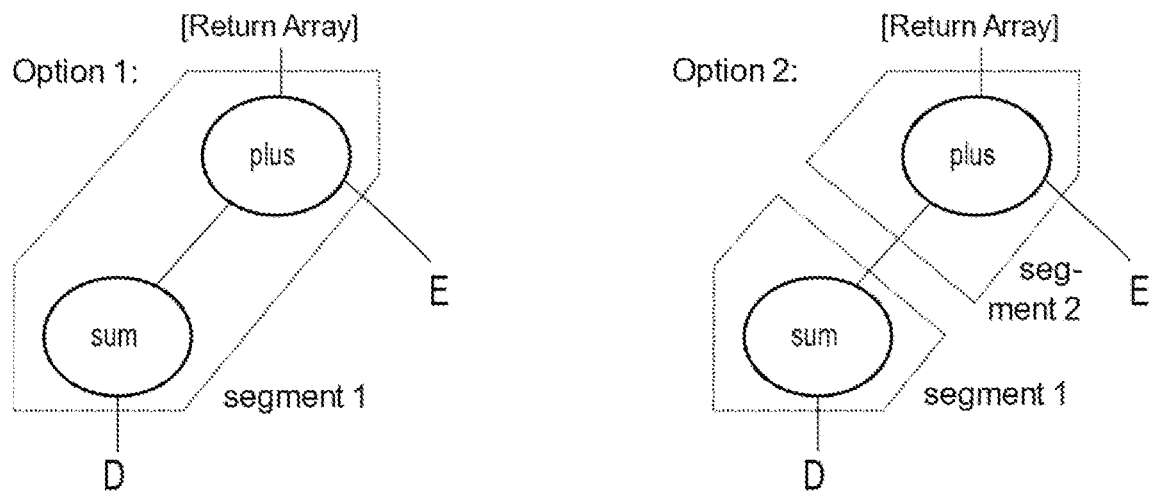
FIG. 6 illustrates method steps of a computer-implemented method according to embodiments.

Above table 2 lists the properties for an exemplary computing (execution) system that may be used for executing compute kernels corresponding to the segmenting options illustrated in FIG. 6 for the exemplary program code:

$$\text{sum}(D)+E.$$

In the exemplary embodiment, the system of table 2 has (at least) 4 processing units, while only PU 2 and PU 4 are configured to be considered for executing the array instructions from the user code. PU 2 is a CPU with a maximum capability of executing $3*10^{11}$ floating point operations (FLOP) per second. PU 4 is a GPU with a maximal capability of executing $3*10^{12}$ FLOP per second. Both units have dedicated memory storages associated with them, which are connected via PCI bus with a maximal transfer rate of $1.5*10^{10}$ bytes per second.

For this example, it is assumed that the input data array D has 3 dimensions with size [1000,1000,100] and is currently stored on the memory associated with PU 2 only. The elements of D are double precision floating point numbers and span memory of $8*10^{8}$ bytes. Input array E has 2 dimensions of length [1000,1000], spanning $8*10^{6}$ bytes on the memory, associated with PU 4 only.

In one embodiment, the method uses a compiler, regularly computing the predicted costs for both segmenting options individually and selecting the option, associated with lowest cost. Such information is nevertheless required prior to executing the segment and in a later block 30, hence do not significantly increase the compilers runtime overhead.

The first segmenting option (option 1) in FIG. 6 includes the plus instruction into the segment to create a single segment for both array instructions. $10*10^{10}$ FLOPs are required to compute the result for this segment with the exemplary input data D and E.

The compiler, here, computes the individual cost for executing the segment on each of the available PUs. It considers current data storage locations, expected minimal data transfer times, processing unit capabilities and commonly selects the PU, where the segment result is expected to be computed faster or with lower energy.

For example, the fused segment (option 1 in FIG. 6) is expected to require at least $3.39*10^{-2}$ seconds to compute all $10^{10}$ FLOPs on the PU 2. This cost includes the minimal time required to copy array E's data from the memory of PU 4 to PU 2 and to perform all required numerical calculations on PU 2. The compiler would likely select PU 2 for execution, since selection of PU 4—due to higher transfer costs of D to PU 4—would require at least $5.7*10^{-2}$ seconds.

The compiler compares the cost of option 1 with the cost for option 2. Option 2 introduces a segment border. Computing the result of the user code instruction sum(D)+E now requires the execution of both, segment 1 and segment 2 in FIG. 6, option 2. Each of the two segments execution PU is individually determined and selected by the compiler. According to table 2, the compiler finds, that the 9*10^10 FLOPs of segment 1 require less time (cost) when executed on PU 2 compared to PU 4, while the subsequent segment 2 is expected to compute the result with 1*10^10 FLOPs faster on PU 4. The segment border introduces an intermediate array, storing the result of segment 1, which is transferred to PU 4 before executing segment 2 on PU 4. The transfer pays off (in terms of execution time/energy) because of the higher maximal FLOP per second capability of PU 4 compared to PU 2.

Hence, by comparing costs for option 1 and option 2 the compiler prefers option 2 over option 1, due to its lower expected minimal execution time/cost. Accordingly, the binary instruction plus is not included into the first segment but a segment border is introduced (block 28) and a new segment, containing the plus operation is started by the compiler.

In further embodiments, the workload of a segment is distributed onto multiple PUs for concurrent execution instead of using a single PU as in this example. Accordingly, the predicted costs can be computed as described below and the selection of the best segmenting option works similarly.

The method works similarly for other array instructions. For example, the compiler can perform the same calculations on such array instructions, which, when included into a segment, can potentially significantly increase the workload of a segment. For example, a binary instruction matmul (matrix multiplication) may be more efficiently executed in a separate segment instead of in a segment together with further instructions. The compiler can evaluate both options and decide for the faster option or the one, predicted to consume less energy, considering all relevant factors of the current runtime situation.

The method described typically prefers the fastest execution strategy for the specific runtime situation. If the compiler considers the current level of utilization/the accumulated costs of segments enqueued for a PU in the cost model the method can lead the execution path to processing units which are currently less utilized than others, particularly if segments are executed asynchronously. It segments the user code into algorithmic chunks, whose size and form support the transfer of execution towards underutilized or such processing units, which expose a higher computing capability than others.

Alternatively, more information or fewer (available) information may be considered by the compiler. For example, not only data transfer rates between individual PU memories can be considered, but also the time required to load data into registers can be used for computing a result. Or, data transfer times may also consider a time or energy, often required to wait or spent for waiting on the start of executing a command after the command was initiated (overhead for starting a transfer or execution command; command queue latency). Such overhead may be provided as configured correction value by the user or acquired by measurements once or repeatedly.

A compiler operating according to the described method may computes or considers average values for all or for some of described properties/influencing factors instead of the minimal predicted values. Such average values may be determined by measurements, by preconfigured and/or cached values and/or from lookup-tables. An implementation may or may not consider effects caused by other processes running on the execution system and/or current device utilization rates to adjust predicted costs for executing a segment.

After the last array instruction node argmin was included into the current segment in block 24, the compiler updates the FMI with the argmin operation in block 26 and proceeds to block 22, inspecting further nodes of the AST in FIG. 5. Since no further, suitable and known array instruction node was found, segmenting ends by inserting a segment border.

Typically, when the compiler in block 22 finds an array instruction, whose output information at least partly depends on the value of at least one element of an input array data structure instance creation of the segment is ended.

Many compiler implementations can increase the efficiency of the method by converting some looping instructions into looping operations and including them into a segment, often by conversion of loop indices into new data dimensions. This method is particularly useful if individual loop iterations can be computed independently and in arbitrary order.

For example, consider the following user code loop:

```
for (int i = 0; i < A.S[1]; i++) {
    A[3,i] = sin(A[3,i]);
}
```

According to an embodiment, the loop is converted into the following expression:

$A[3,\text{full}]=\sin(A[3,\text{full}]);$

In this embodiment, the compiler implementing this method can inspect the loop index range or loop bounds. It finds the range of index values for the loop's iteration variable i to span the values 0 . . . A.S[1]−1, i.e.: all element indices for the second dimension of A, in ascending order. The compiler may find this index range by inspecting the loop header definition for known patterns and/or infers the index range from the context of code expressions, utilizing i. For example, A.S[1] can be known to the compiler as the length of the second dimension of A, and the array access expression A[3, i] uses the iteration variable i to address an element by the second dimension of A. Further, the semantic of a specialized function 'length(A, 1)' or similar may be known to the compiler.

The compiler can replace the scalar iteration variable i by a range of indices according to the loop bounds:

$A[3,\text{range}(0,A.S[1])]=\sin(A[3,\text{range}(0,A.S[1])]);$

Here, the 'range' function produces an array of indices as identified by the compiler. Some compilers may apply further optimizations to the conversion. For example, here, the compiler can check for the index range spanning the full dimension length, and in this case replace the array index range by the placeholder 'full', which addresses a full dimension. Other languages have similar constructs. For example, with the ':' (colon) operator in the Matlab language the code converts into/corresponds to the Matlab expression:

$A(3,:)=\sin(A(3,:))$

The modified expression—when further converted into a segment as described in this method—processes a larger workload compared to the scalar expressions from the loop body. The segment, therefore, can often more efficiently be executed on parallel computing resources. Also, the compiler was able to elide the loop completely, improving the ratio of valuable, elementary, numerical operations to such operations, related to the necessary overhead of addressing data (element access) and/or controlling the execution path (loop instructions, conditionals).

Often, an efficient implementation of this method requires further actions to be performed. The compiler may perform dependency analysis on the instructions of the loop body in order to determine, if the loop can be converted/elided. Sometimes, the index of the dimension addressed by an iteration variable must be modified, including modifying the array instance itself.

For example, the dimension being iterated along can be moved to a free/unused dimension index to prevent from conflicts with the same dimension from other array instances. Such embodiments modify all array instances, utilizing the iteration variable, accordingly and reverse the dimension index change on the result of the segment after processing.

Thus, above user code UC may be converted into or replaced by following code, moving the iteration dimension #1 to the free, unused dimension #2 in a pre-processing block on all involved array instances:

```
//pre-processing
var Amod = swap(A, 1, 2);
var Cmod = swap(C, 1, 2);
// 'loop body' processing
classes = argmin(sqrt(sum((Amod − B) ** 2, dim: 0)), 1) * sin(Cmod);
// post-processing
classes = swap(classes,2,1);
```

Here, the swap function exchanges two specified dimensions from an array. Often, a copy of array element values is not performed, but a view of the original array is produced, which renders this method efficient. Note, how the array B is not modified, because it is not affected by the loop iteration. However, the compiler may also inspect B for determining a free/unused dimension index.

The compiler often further converts the modified loop body into at least one segment and executes it as described herein. It will be obvious that above inclusion of a loop again increases the workload of the segment and allows one to utilize parallel resources more efficiently compared to performing the segments instructions with individual loop iterations. It will also be clear, that above conversion of a scalar loop index into a range of indices is often not feasible or not possible without the further methods described herein, because of memory constraints imposed by the increased workload and thus increased memory storage requirement. Commonly, such "code vectorization" is often limited by the size of intermediate arrays, which often become too large to be efficiently stored in the memory of common computing systems. Our method, in difference to that, allows to incorporate many loop constructs at the same time. A compiler according to our method will elide most intermediate arrays, thus is often able to process workloads of arbitrary size.

In block 30 of FIG. 2, the execution strategy for the segment may be determined and the at least one selected processing unit is prepared with kernel programs according to the segment's operations.

Typically, the compiler determines the workload of the segment and decides for an execution strategy, for example based on the cost for a PU.

Therefore, runtime information about available PU(s) is determined. Sometimes, this information is determined before or during segmenting block 20, for example, if segmenting decisions (24, Table 2) rely on cost calculation, as described above.

Kernel compilation for executing a segment on a selected processing unit typically comprises at least one optimization step or strategy. For example, and because the proposed method allows to consider all runtime influencing factors, kernels can be optimized for specific runtime size information of the at least one input array data structure instances (A1, B1). Note that kernels specialized e.g. for specific stride information of the input data can often utilize the hardware resources more efficiently compared to such kernels, where stride information is kept variable. While latter, non-specialized kernels require the stride values to be frequently read from memory addresses, a specialized version can use constant values in the kernel code. Further specializations may be applied for other runtime information, for example the number and/or lengths of dimensions of the input array data structure instances.

The advantage of more efficient execution by specialization implies decreased compatibility: kernels specialized for certain runtime information have more often to be recreated for execution with different input data instances, having different runtime information. This is even true, for such kernels compiled to be executed on PUs with the same or similar hardware characteristics, where the same kernel could otherwise be used for executing the segments array operations.

Some embodiments allow to adjust the level of specialization or the number and kind of information to be used for kernel specialization manually, by configuration, or dynamically at runtime.

Some embodiments perform all steps of the method at runtime (JIT—just in time). Other implementations optimize the method overhead by performing some steps or parts of the method ahead of runtime, in particular at a compile time (first compiler stage, prior to compiling the kernel(s) in the second (JIT) compiler stage). For example, AST analysis may be at least partly performed in an early compilation step and before runtime information becomes available.

However, since the concrete shape, form and content for a segment kernel eventually used for executing the segments array operations as well as the workload processed by the kernel typically depends on most or all information (related to hardware, algorithm and data) the compiler waits until this information is completely known (at runtime) for deciding the final segment kernel implementation and execution strategy. An expert will appreciate the option to prepare a segment or (segment) kernel in multiple stages (points of time), for example adding and/or considering new information as it becomes available.

All potential variations of runtime information form a—potentially large—parameter space. One optimization strategy is to prepare all potential or likely segment kernel forms in advance at compile time, limiting the processing effort of the compiler at runtime to the selection of the appropriated kernel implementation, for example by help of a decision tree. A promising way to distribute the workload of a segment onto the enabled PUs for execution is to consider the number of output elements of an output produced by a segment according to the at least one input array (A1, A2) and to the segments FMI. Often, each output element can be computed independently, hence can be computed by an individual PU. The compiler commonly transfers the responsibility for computing a certain number of output elements to a number of PUs for processing, often passive PUs, together with the segments kernel, prepared for the specific technology of the PU. If the PU is an active PU, the compiler may instead send the sequence of instructions collected in the segment to the PU, often in an abstract form, like an AST, or a binary representation thereof. In this case the active PU is commonly responsible for distributing the workload received onto its subunits, often passive PUs or—if further levels of nesting exist—active PUs.

An active PU often performs the same or similar steps as described above, often recursively involving at least one of its passive subunits, if existing, for preparing execution of the workload of a segment received.

The number of output elements sent to each PU for computing is calculated in a way that the costs for all PUs is nearly equal, i.e.: the predicted points in time, when each PU is expected to finish executing its part of the workload differs by the lowest amount.

There are several ways to calculate the workload distribution, for example by solving an equation system or by using a simple optimization method, for example an iterative solver. Often, the calculation considers the times required to transfer the workload data and the kernel/segment instructions data to each PU. Sometimes, a correction factor or summand, for example for the overhead of initiating the kernel execution, for processing the segments operations or AST instructions, for distributing workload data to subunit memories on an active PU is also considered.

Some compilers implement short paths for small workloads, for example a scalar implementation of a segments operations in the case of scalar input, scalar intermediate results, and scalar outputs. Typically, such implementations target execution on a single PU, sometimes the host controller, if any.

Sometimes, the compiler cannot distribute a workload below a certain size onto multiple or all PUs enabled, often, due to the overhead/the times required for managing multiple PUs and for data transfer to other PUs being too high compared to the workload or the potential cost saving. In this case, the segment is typically computed on the single PU, for which a minimal cost is calculated.

The at least one kernel is executed in block 40 on the at least one processing unit.

Often, kernel execution is especially efficient when kernels are executed asynchronously. For example, in an implementation on a multithreaded system often the main thread is responsible for executing control instructions, performing segmenting, workload distribution and kernel initiation. The main thread, however, does typically not execute the segment kernels (directly) nor wait for completion of the segments kernel execution by other threads or PUs but continues processing subsequent instructions, building and/or processing subsequent segments, distributing subsequent segments workload and initiating execution of subsequent/further segments kernels. Such system often prepares efficient execution for many array instructions in advance and ahead of execution time, i.e.: prior to kernel execution.

An important synchronization point (where the main thread must wait until kernels have finished executing) is the required access to output array element values. Typically, such system enqueues segment kernels to device specific command queues for execution on a specific PU. The length of the queue, corresponding to the accumulated costs of the kernels enqueued, typically contributes to the computation of cost for new segments and new array instructions to be scheduled by the main thread.

Another synchronization point can be a failed attempt to allocate memory required for executing a segment on a PU selected for executing the segment instructions/the first segment kernel. Typical embodiments recognize and recover from such failure and continue processing or retry allocation when sufficient memory becomes available, typically after a segment execution was completed and/or a sufficiently large memory region became available on the selected PUs memory.

What is claimed is:

1. A computer-implemented method comprising:
receiving a program code comprising a sequence of array instructions for at least one input array data structure storing multiple elements of a respective common data type, and function meta information, FMI, allowing for determining an output size information of an output array data structure of each array instruction of the sequence of array instructions for an input size information of the at least one input array data structure;
generating, from the program code, a first program segment, generating the first program segment comprising:
determining a runtime size information of a respective runtime instance of the at least one input array data structure; and
including, from the sequence of array instructions and based on the runtime size information, the function meta information and the array instructions, array instructions into the first program segment as corresponding array operations;
receiving hardware information of a processing unit;
compiling, based on the first program segment, the runtime size information and the hardware information, a first compute kernel which is executable on the processing unit; and
executing the first compute kernel on the processing unit using the runtime instance of the at least one input array data structure as input.

2. The method of claim 1, wherein including the array instructions as corresponding array operations comprises at least one of:
including a set of array instructions, in particular a subset of array instructions from the sequence of array instructions into the first program segment as corresponding array operations;
using the function meta information and the runtime size information to determine a respective runtime output size information of the array operations;
including a reduction array instruction as a reduction array operation;
including an unary array instruction as an unary array operation;
including an array access instruction as an array access operation;
converting a scalar iteration variable of a looping instruction over at least one array access instruction for an array data structure corresponding to or being derived from the at least one input array data structure into an index data structure referring to multiple loop iteration index values produced by the looping instruction and using the index data structure instead of the scalar iteration variable with the array access instruction; and
including a binary array instruction as a binary array operation into the first program segment.

3. The method of claim 1, further comprising:
determining the respective sizes of runtime instances of the input array data structures of the binary array instruction, and including the binary array instruction as the binary array operation into the first program segment if all sizes match or if at least one of the runtime instances of the input array data structures to the binary array instruction meets a complexity criterion, and ending generating the first program segment otherwise;

ending generating the first program segment depending on computational cost of the first program segment;
verifying, before including an array instruction into the first program segment, if including the array instruction results in a first program segment comprising lower or equal computational cost than a sum of computational cost of the first program segment without the array instruction to be included and computational cost of a new program segment only comprising the array instruction to be included, and ending generating the first program segment otherwise;
ending generating the first program segment when an array instruction is found, whose output size depends on an element value of at least one of its input array data structures;
ending generating the first program segment after including a reduction array instruction, if the reduction array instruction is, based on the FMI and the runtime size information, determined to produce one output element, for example zero;
after ending generating the first program segment, generating from the program code, a second program segment, generating the second program segment comprising including, from the sequence of array instructions and based on the runtime size information, the function meta information and the array instructions, a remaining array instruction into the second program segment as a corresponding array operation, typically a set of remaining array instructions; and
including a deferred-merge array operation resulting from including the reduction array instruction as reduction array operation during ending generating the first program segment.

4. The method of claim 1, wherein receiving the hardware information of the processing unit comprises:
receiving hardware information of a first subunit of the processing unit; and
receiving hardware information of a second subunit of the processing unit, and
wherein compiling the first compute kernel comprises:
determining, based on the hardware information of the first subunit, the hardware information of the second subunit, and the FMI, from the runtime instance of the at least one input array data structure a first partial input data structure instance referencing a first part of the runtime instance and a second partial input data structure instance referencing a second part of the runtime instance so that a cost of executing the array instructions is expected to be lowest when the first subunit performs the corresponding array operations of the set of array operations using the first partial input data structure instance as input, and when the second subunit performs the corresponding array operations using the second partial input data structure instance as input; and at least one of:
compiling the first compute kernel to be executable on the first subunit and on the second subunit;
compiling a first compute sub-kernel of the first compute kernel, the first compute sub-kernel being executable on the first subunit of the processing unit; and
compiling a second compute sub-kernel of the first compute kernel, the second compute sub-kernel being executable on the second subunit of the processing unit.

5. The method of claim 4, wherein the first compute kernel is compiled to be executable on the first subunit and on the second subunit, if, according to the hardware information, the first and second subunits are of the same type and/or have the same computational characteristics, and/or if according to the FMI, a size information of the first partial input data structure instance equals the corresponding size information of the second partial input data structure instance.

6. The method of claim 4, further comprising:
determining a size of the partial input data structure instance and a size of the second partial input data structure instance according to the computational capacities for the first and second subunits;
creating the first partial input data structure instance and the second partial input data structure instance;
using the first partial input data structure instance as input of the first compute kernel executed on the first subunit of the processing unit;
using the second partial input data structure instance as input of the first compute kernel executed on the second subunit of the processing unit; and
assembling a first output of the first compute kernel executed on the second subunit and a second output of the first compute kernel executed on the second subunit to form a first output array structure instance.

7. The method of claim 1, comprising:
determining a workload of the respective program segment based on the runtime size information of the respective runtime instance and the FMI;
determining a respective portion of the workload to be processed by the first subunit and the second subunit;
using the hardware information to determine a respective computational capacity for the first subunit and the second subunit.

8. The method of claim 1, further comprising:
analyzing the program code and/or generating an abstract syntax tree for the program code;
generating an empty segment for the respective program segment;
inspecting an abstract syntax tree of the program code; and
including a node found in the abstract syntax tree into the respective program segment.

9. The method of claim 1, wherein the hardware information comprises at least one of a type of the processing unit, a number and/or a type of computational subunit of the processing unit, such as SIMD processing units, a frequency of a processor, a capability of executing a number of floating point instructions per time interval, a number of similar or equal instructions to be executed together, a transfer speed for data, a storage capacity, a capability to process certain operations more efficiently.

10. The method of claim 1, wherein the function meta information comprises a corresponding array instruction meta information for each of the array instructions of the sequence, and/or wherein including the array instructions into the first program segment as corresponding array operations comprises including, into the first program segment, the corresponding array instruction meta information for each of the array instructions, and/or wherein each array instruction meta information allows for determining an output size information of an output of the respective array instruction for an input size information of at least one input array d structur espective array instruction.

11. The method of claim 1, wherein the function meta information comprises a size information, an element type information, and/or a layout information for each of the array operations.

12. The method of claim 1, wherein the runtime size information comprises at least one of a number of dimensions of the respective runtime instance, a length of at least one of the dimensions of the respective runtime instance, a data type of the elements of the respective runtime instance, a location information of the respective runtime instance, and a stride information of at least one of the dimensions of the respective runtime instance.

13. The method of claim 1, further comprising using an output array structure instance resulting from executing the first compute kernel on the processing unit, in particular the first output array structure instance as input array data structure instance of a second compute kernel compiled based on a second program segment generated from the program code.

14. The method of claim 1, wherein the respective program segment is generated by at least one compiler, and/or wherein, from the program code, several program segments are generated, in particular a sequence of program segments is generated, and/or wherein a corresponding compute kernel is compiled for each of the program segments.

15. The method of claim 1, wherein the runtime size information for a respective runtime instance is determined by a further program segment.

16. The method of claim 15, wherein the runtime size information for the respective runtime instance is determined prior to and/or independent from executing a compute kernel of the further program segment, in particular a previous program segment.

17. The method of claim 12, wherein the location information of an input array data structure instance is determined by a further program segment, in particular the second program segment.

18. The method of claim 1, wherein the respective program segment is generated as an intermediate representation, in particular a byte code representation, and/or wherein the compute kernel is compiled by a JIT-compiler.

19. A non-volatile computer-readable medium comprising instructions which, when executed by a computer, cause the computer to carry out the following steps:
receiving a program code comprising a sequence of array instructions for at least one input array data structure storing multiple elements of a respective common data type, and function meta information, FMI, allowing for determining an output size information of an output array data structure of each array instruction of the sequence of array instructions for an input size information of the at least one input array data structure;
generating, from the program code, a first program segment, generating the first program segment comprising:
determining a runtime size information of a respective runtime instance of the at least one input array data structure; and
including, from the sequence of array instructions and based on the runtime size information, the function meta information and the array instructions, array instructions into the first program segment as corresponding array operations;
receiving hardware information of a processing unit;
compiling, based on the first program segment, the runtime size information and the hardware information, a first compute kernel which is executable on the processing unit; and
executing the first compute kernel on the processing unit using the runtime instance of the at least one input array data structure as input.

20. A computer-implemented method comprising:
receiving a program code comprising a sequence of array instructions for at least one input array data structure storing multiple elements of a respective common data type, and function meta information, FMI, allowing for determining an output size information of an output array of each array instruction of the sequence of array instructions for an input size information of the at least one input array data structure;
generating, from the program code, a first program segment, generating the first program segment comprising:
determining a runtime size information of a respective runtime instance of the at least one input array data structure; and
including, from the sequence of array instructions and based on the runtime size information, the function meta information and the array instructions, array instructions into the first program segment as corresponding array operations, including the array instructions as corresponding array operations comprising using the function meta information and the runtime size information to determine a respective runtime output size information of the array operations;
receiving hardware information of a processing unit;
compiling, based on the first program segment, the runtime size information and the hardware information, a first compute kernel which is executable on the processing unit; and
executing the first compute kernel on the processing unit using the runtime instance of the at least one input array data structure as input.

* * * * *